United States Patent [19]

Hunter

[11] 4,177,926

[45] Dec. 11, 1979

[54] WATER ACCUMULATOR-DISTRIBUTOR FOR AGRICULTURAL SPRINKLER

[75] Inventor: Edwin J. Hunter, Rancho Santa Fe, Calif.

[73] Assignee: The Toro Company, Riverside, Calif.

[21] Appl. No.: 891,825

[22] Filed: Mar. 30, 1978

[51] Int. Cl.$^2$ ............................................... B05B 1/08
[52] U.S. Cl. .................................................... 239/99
[58] Field of Search .............................. 239/99, 101

[56] References Cited

U.S. PATENT DOCUMENTS

| Re. 20,826 | 8/1938 | Kind et al. | 239/99 |
|---|---|---|---|
| 1,998,592 | 4/1935 | Schenk | 239/99 |
| 3,321,138 | 5/1967 | Curry | 239/101 X |

FOREIGN PATENT DOCUMENTS

| 1044496 | 11/1958 | Fed. Rep. of Germany | 239/99 |
|---|---|---|---|
| 306819 | 8/1971 | U.S.S.R. | 239/101 |
| 394106 | 8/1973 | U.S.S.R. | 239/101 |
| 447989 | 4/1974 | U.S.S.R. | 239/101 |

Primary Examiner—Robert W. Saifer
Attorney, Agent, or Firm—Poms, Smith, Lande & Rose

[57] ABSTRACT

An accumulator-distributor for gathering a quantity of water under pressure and rapidly discharging the quantity of water in bursts whereby large agricultural areas can be watered from a low volume source of irrigation water is shown. An expandible chamber is provided having a flexible diaphragm as one wall thereof. Bias means carried by the flexible diaphragm are adapted to exert a pressure upon the valve member closing the outlet opening from the chamber an amount insufficient to retract the valve member against the differential pressure of the accumulated water acting on the valve member. A second member is adapted to contact and lift the valve member from the valve seat at the point of maximum expansion of the chamber whereby the differential pressure is removed from the valve member and the bias means is able to rapidly withdraw the valve member completely from the outlet opening from the chamber to allow the rapid and complete expulsion of the accumulated water therein in an optimal manner.

22 Claims, 6 Drawing Figures

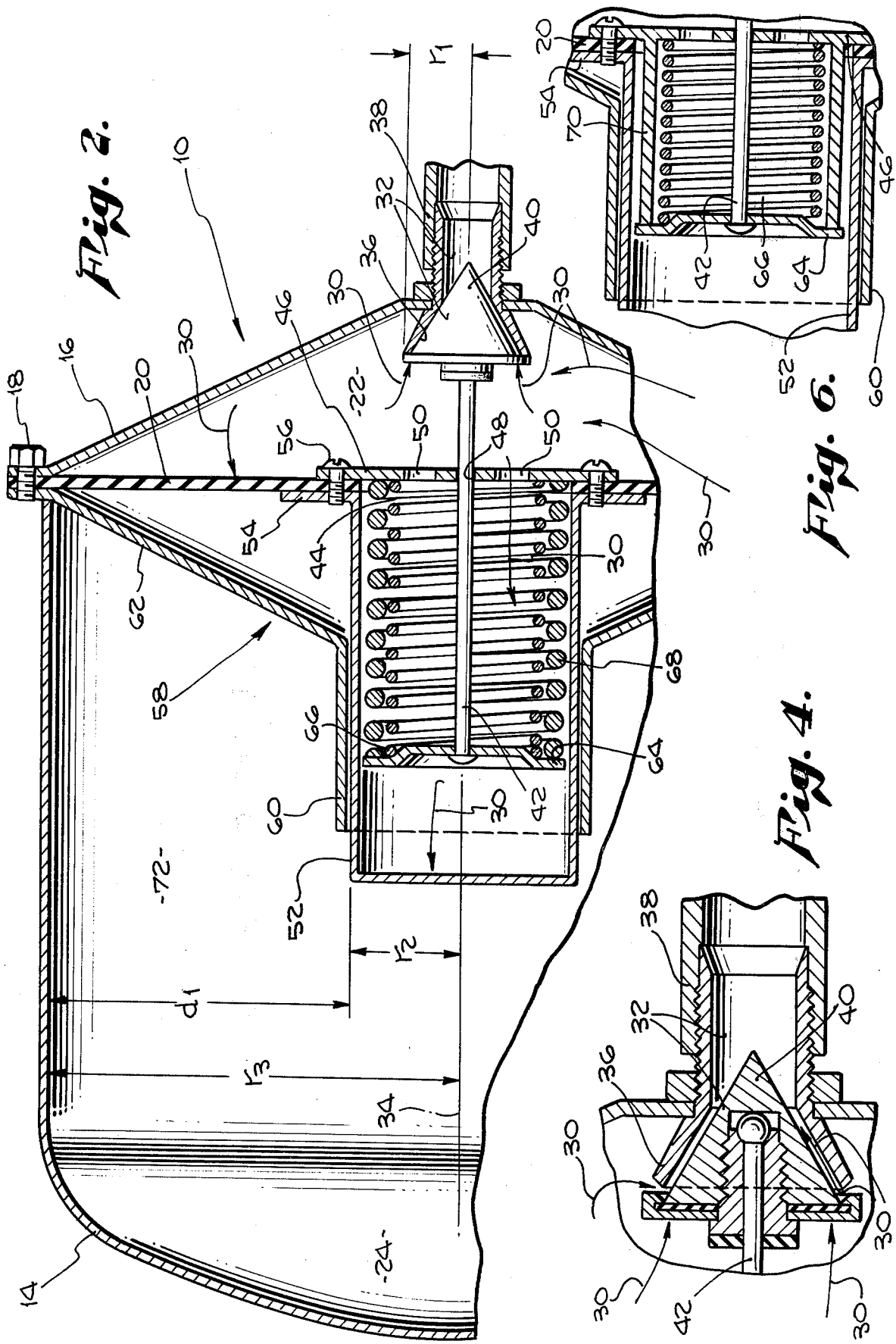

WATER ACCUMULATOR-DISTRIBUTOR FOR AGRICULTURAL SPRINKLER

BACKGROUND OF THE INVENTION

The present invention relates in general to methods and apparatus for irrigating agricultural fields and more particularly to sprinkler apparatus adapted to accumulate a quantity of irrigation water to be expulsed in a rapid manner so as to irrigate areas not reachable under continuous flow conditions employing the flow rates and pressures available.

In my copending U.S. Pat. Application Ser. No. 827,787, filed Oct. 13, 1977 entitled "Travelling Sprinkler System and Method", assigned to the common assignee of this application, a travelling sprinkler system is disclosed employing a sprinkler head adapted to accumulate a volume of irrigation water and rapidly expulse the water through a nozzled outlet opening to force the water great distances in bursts while employing water supply lines providing flow rates and pressures which would be unable to reach such irrigation distances if a continuous stream irrigation were employed. In the aforementioned apparatus, the valve member closing the outlet opening from the accumulator is lifted to allow the burst of water by the force created on a diaphragm connected thereto by the internal pressure being created within the accumulation chamber from the filling thereof with water. Since the entire valving operation is pressure dependent, the operation thereof can vary as a function of the operating pressure of the supply line feeding the accumulator-distributor. While the apparatus disclosed by the aforementioned copending application has proved satisfactory in tested embodiments to date, the pressure based operation and attendant possibility for unforeseen erratic operation from particular configurations, pressure variations, and pressure responsive member aging produced a desire to have an accumulator-distributor operating completely in a mechanical manner whereby constant operational characteristics are achieved without regard to pressures, sizes, and component aging within normal tolerance limits.

Wherefore, it is the object of the present invention to provide such a mechanically operated accumulator-distributor particularly adapted for incorporation within travelling sprinkler apparatus as disclosed in the aforementioned copending application or the like.

SUMMARY

The aforementioned objective has been accomplished by the accumulator-distributor disclosed hereinafter comprising a hollow closed body having an inlet adapted for connection to a source of fluid under pressure and an outlet opening including a valve seat; a flexible diaphragm disposed within the body to divide the body into two chambers, the inlet and outlet opening being in communication with one of the two chambers, the other of the two chambers being filled with compressed gas at a pressure less than the minimum pressure of the fluid under pressure; a valve member adapted for sealed mating with the valve seat to close the outlet opening to prevent fluid from exiting the one of the two chambers through the outlet opening, the member being movable between a first position where the valve seat is closed thereby and a second position where the valve seat is open for the passage of fluid therethrough to exit the body through the outlet opening; first bias means carried by the flexible diaphragm for increasingly urging the valve member towards the second position as the flexible diaphragm is flexed by an increasing volume of fluid under pressure being introduced into the one of the two chambers through the inlet, the first bias means being adapted to produce a maximum bias force insufficient to lift the valve member from the valve seat against the differential pressure of the fluid in the one chamber when the valve member is in the first position and sufficient to move the valve member completely from the first position to the second position when the differential pressure is removed therefrom; and, means carried by the flexible diaphragm for lifting the valve member from the valve seat an amount sufficient to remove the differential pressure therefrom when the diaphragm reaches its desired point of maximum flexure from the passage of fluid under pressure into the one of the two chambers whereby the valve member is moved to the second position by the first bias means to allow the water accumulated in the one chamber to be expulsed through the outlet opening.

DESCRIPTION OF THE DRAWINGS

FIG. 2 is a cut-away plan view of the accumulator-distributor of the present invention in the plane II—II, at the moment just following the completion of a water expulsion cycle.

FIG. 4 is a detailed cut-away view through the valve member and valve seat of the present invention at the operating time sequence of FIG. 3 shown in the plane IV—IV.

FIG. 6 is a cut-away view of an alternate embodiment of the valve member moving apparatus of the present invention.

DESCRIPTION OF THE PREFERRED EMBODIMENT

Figure 1:
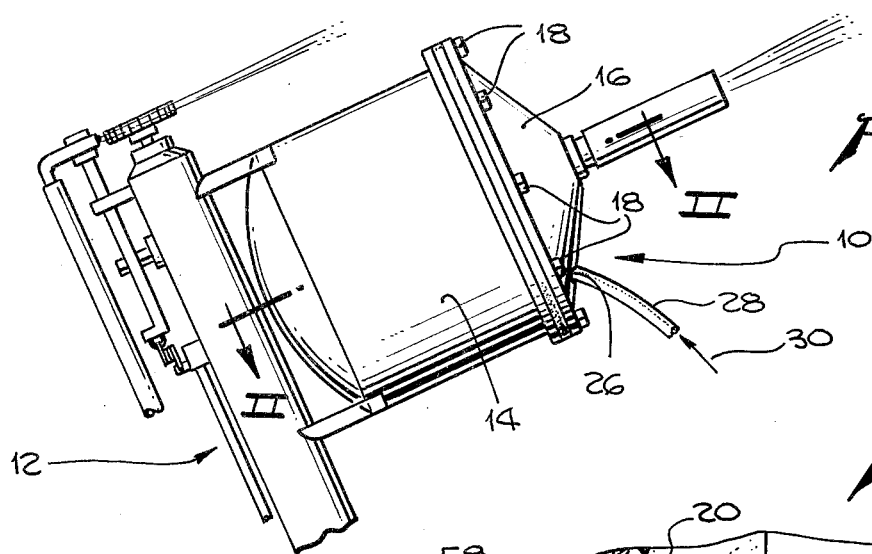
FIG. 1 is a side elevation of the accumulator-distributor of the present invention attached to the travelling agricultural sprinkler apparatus as disclosed in my aforementioned copending application Ser. No. 827,787.

Referring briefly to FIG. 1, an accumulator-distributor according to the present invention, generally indicated as 10, is shown mounted to travelling agricultural sprinkler apparatus 12 as disclosed in my copending application Ser. No. 827,787. Reference to said copending application and FIG. 1 alone would lead one to believe that the apparatus is identical inasmuch as the present invention is adapted for incorporation within the same housing. Comparison of the internal structure of the operating apparatus contained therein of the said copending application as compared to the description of the present invention to be hereinafter described will show that the theory of operation and method of accomplishment are entirely different.

Referring now to FIG. 2 in combination with FIG. 1, the accumulator-distributor 10 of the present invention can be seen to comprise a cylindrical body 14 being open at one end and having a top 16 releasably attached thereto as by bolts 18 disposed circumferentially about the periphery of the respective mating surfaces of body 14 and top 16. A flexible diaphragm 20 is disposed between the body 14 and top 16 as by being gripped between the body 14 and top 16 about the periphery thereof as shown. Flexible diaphragm 20 thus divides the hollow body formed of cylindrical body 14 in combination with top 16 into two chambers being an accumulating chamber 22 and a compression chamber 24. The accumulating chamber 22 has an inlet 26 communicating thereto adapted for connection to a water supply hose 28 providing water 30 under pressure into accumulating chamber 22. Additionally, an outlet opening 32 is provided in top 16 disposed along the longitudinal axis 34 of cylindrical body 14 and top 16. Outlet opening 32 has a conical valve seat 36 concentrically disposed therearound and a nozzle 38 connected on the outside thereof for directing water 30 exiting outlet opening 32 in a confined path for maximum distance. A conical mating valve member 40 is disposed to sealably mate with valve seat 36 to, thereby, close outlet opening 32. Valve member 40 is carried on one end of a shaft 42. The utilization of a conical valve seat and mating conical valve member specifically as shown in FIG. 2 and in detail in FIG. 4, while preferred, is disclosed in the aforementioned copending application Ser. No. 827,787 and, therefore, in and of itself, forms no part of the present invention.

As can be seen in FIG. 2, flexible diaphragm 20 is annular in shape, having a circular opening 44 disposed concentrically about axis 34. A rigid circular plate 46 is disposed within accumulating chamber 22 in overlapped concentric relationship with the opening 44. Plate 46 has a center hole 48 disposed concentrically with axis 34 through which shaft 42 passes in freely sliding relationship. A plurality of water holes 50 are disposed through circular plate 46 concentrically about the center hole 48 for purposes to be discussed hereinafter.

A cylindrical container 52 is disposed concentrically along longitudinal axis 34 on the opposite side of flexible diaphragm 20 within compression chamber 24. Cylindrical container 52 is closed on the end opposite flexible diaphragm 20 and has a shoulder 54 extending radially outward along the periphery of the opposite end. Shoulder 54 is held tight adjacent flexible diaphragm 20 by a plurality of bolts 56 passing through circular plate 46 and flexible diaphragm 20 into threaded engagement with shoulder 54 at equally spaced intervals around the circumference thereof. When thus assembled and tightened, flexible diaphragm 20 in combination with cylindrical container 52 provides a leak-proof partially-flexible barrier between the accumulating chamber 22 and the compression chamber 24.

A guide and stop assembly, generally indicated as 58, is provided to assist the elements to be described hereinafter to repeatably perform. Guide and stop assembly 58 comprises a cylindrical guide portion 60 disposed concentrically with cylindrical container 52 to guide cylindrical container 52 in longitudinal movement along longitudinal axis 34 whereby diaphragm 20 is also made to flex in a uniform manner. Sufficient clearance is provided between cylindrical guide portion 60 and cylindrical container 52 to allow the free passage of air therebetween. Cylindrical guide portion 60 is held in the desired position concentric with longitudinal axis 34 by conical portion 62 extending from the junction of body 14 and top 16 angularly away from flexible diaphragm 20 to its point of mating with cylindrical guide portion 60. As thus configured, conical portion 62 provides a rigid barrier against which flexible diaphragm 20 is supported against flexure beyond its working limit during the filling of accumulating chamber 22 by pressurized water 30 in the manner to be hereinafter described.

Returning once again to the shaft 42 and valve member 40, previously described, valve member 40 preferably is attached to one end of the shaft 42 in the manner shown in FIG. 4. This mounting method was described in the aforementioned copending application and forms no part of the present invention. Shaft 42 is disposed to pass along longitudinal axis 34 through center hole 48 into the cylindrical container 52. A circular metal plate 64 is provided normal to the shaft 42 on the opposite end thereof adapted to slide freely within container 52. A first spring 66 is connected between plate 64 and rigid circular plate 46 so as to tend to urge the valve member 40 out of contact with valve seat 36. A second spring 68 is carried by rigid circular plate 46 and adapted to contact the end plate 64 at some point in the flexure of the diaphragm 20 as accumulating chamber 22 is filled with water. Alternatively, a rigid cylindrical collar 70 or the like shown in FIG. 6 could be substituted for second spring 68. The operation of the present invention is dependent upon the ratio of the diameter of the flexible diaphragm to the diameter of the valve member 40 and the sizing of springs 66 and 68. Before discussing the dimensions and sizings of a tested example, however, the operation of the present invention will be discussed which will make the dimensions and sizings more understandable.

Figure 5:
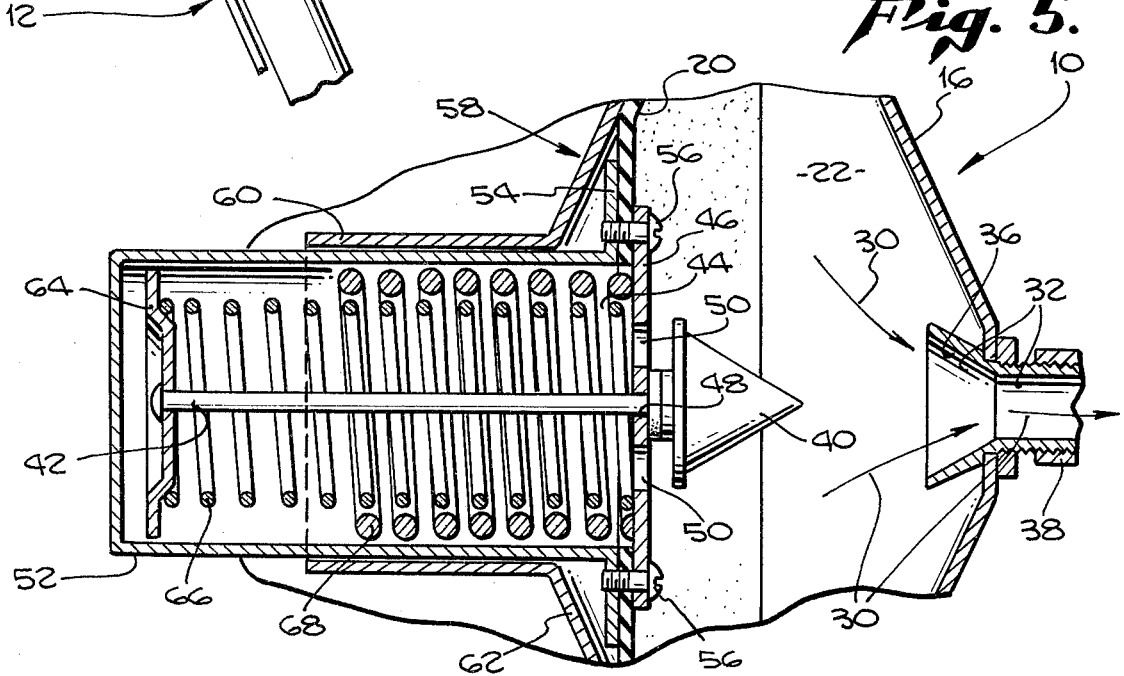
FIG. 5 is a cut-away plan view through the valve member and valve seat of the present invention showing the valve member in its fully retracted position whereby the outlet from the accumulator is completely opened for the rapid expulsion of the water therethrough.

As previously mentioned, FIG. 1 discloses the accumulator-distributor 10 of the present invention immediately following a water expulsion cycle. Compression chamber 24 is initially charged (at time of assembly) with a quantity of compressed gas 72 (e.g. air). The compressed gas 72 in conjunction with the natural bias of the diaphragm 20 provides the expulsing force and returns diaphragm 20 to its "at rest" position of FIG. 2. In the tested example to be described in greater detail hereinafter, the water pressure employed was about 80 pounds per square inch. For proper operation, compression chamber 24 must be compressed to a pressure less than the operating pressure of the water but close thereto so as to provide a maximum expulsion pressure. Thus, in the tested embodiment, compression chamber 24 was filled with compressed air 72 at 70 pounds per square inch of pressure. Water 30 is injected through water supply hose 28 and inlet 26 into accumulating chamber 22. A portion of the water 30 passes through the water holes 50 into container 52 to act against the closed end thereof. In combination, therefore, water 30 acts against container 52 and diaphragm 20 as an effective diaphragm extending completely across the top of cylindrical body 14. Simultaneously, water 30 acts on the back of valve member 40 tending to force valve member 40 tight against conical valve seat 36 inasmuch as there is no equalizing water pressure on the opposite side of valve member 40. Thus, the differential pressure across the valve member 40 tends to maintain valve member 40 tight against valve seat 36 maintaining outlet opening tightly closed. Since flexible diaphragm 20 is able to flex, as more water 30 is injected into accumulating chamber 22, flexible diaphragm 20 flexes towards conical portion 62 and cylindrical container 52 slides through cylindrical guide portion 60 along longitudinal axis 34 to the left as FIG. 5 is viewed. In the process, air 72 is further compressed, spring 66 is compressed and spring 68 ultimately contacts circular end plate 64 and begins to be compressed.

Figure 3:
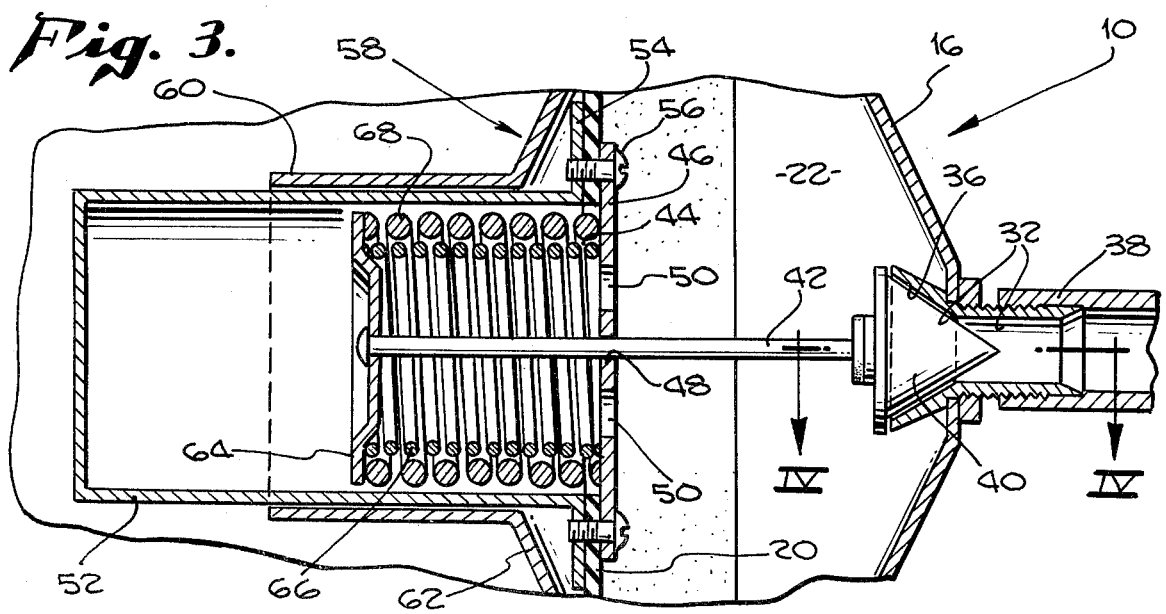
FIG. 3 is a cut-away plane view through the valve and biasing portion of the accumulator of the present invention shown at the moment when the diaphragm has reached its maximum flexure and the valve member is being lifted from the valve seat.

Finally, accumulating chamber 22 reaches its maximum intended expansion with the flexible diaphragm 20 substantially entirely supported by conical portion 62 of guide and stop assembly 58. At this moment, the apparatus appears as shown in FIG. 3. At that moment, the combined effect of first spring 66 and second spring 68 is enough to barely lift valve member 40 from valve seat 36 as shown in detail in FIG. 4. As can be seen in FIG. 4, at that instant, a portion of the water 30 is able to pass along the displaced area between valve member 30 and valve seat 36. With water 30 on both sides of valve member 40, the differential pressure that previously existed is removed. Spring 66 is then able to withdraw valve member 40 from valve seat 36 rapidly and positively to the completely withdrawn position shown in FIG. 5 whereupon the outlet opening 32 is completely opened for the rapid expulsion of water 30 therethrough by the bias force of compressed air 74 and diaphragm 20. As water 30 is expulsed through the outlet opening 32 and nozzle 38 connected thereto, the flexible diaphragm 20 and cylindrical container 52 return to their normal position shown in FIG. 2. Spring 66 being connected to rigid circular plate 46 on one side and circular end plate 64 on the opposite side, valve member 40 is carried in combination therewith back into engagement with conical valve seat 36 also as shown in FIG. 2 to once again begin the accumulation cycle.

When employing the cylindrical collar 70 of FIG. 6, the length of collar 70 from rigid circular plate 46 should be such that collar 70 contacts circular end plate 64 just prior to the point of maximum accumulation within chamber 22 and flexure of diaphragm 20 whereby cylindrical collar 70 forces valve member 40 away from conical valve seat 36 with any additional movement of flexible diaphragm 20 to eliminate the differential pressure and allow spring 66 to completely withdraw valve member 40 in the manner previously discussed.

Returning now to FIG. 2 where the dimensions are indicated, in the tested embodiment previously mentioned, the radius ($r_1$) of the valve member 40 was 0.75 inches giving a diameter thereof of 1.5 inches or approximately 2 square inches of area against which water 30 is acting to force member 40 against valve seat 36. With the 80 pounds per square inch water pressure previously mentioned as being used, this results in 160 pounds of force being exerted against valve member 40 tending to hold it in valve seat 36. The radius of the diaphragm 20 ($r_3$) is comprised of the radius ($r_2$) of the cylindrical container 52 and the distance ($d_1$) from container 52 to the periphery of diaphragm 20, as previously discussed, inasmuch as the water 30 is able to act over that equivalent surface. In the tested embodiment, $r_3$ was 2.25 inches wherefore the diameter of 4.5 inches yielded an area fourteen times that of the valve member 40. The force on diaphragm 20 is, accordingly, fourteen times as great allowing positive action as will be described.

As previously mentioned, compression chamber 24 is prefilled with compressed air 72 at approximately 70 pounds per square inch. Air 72 is further compressed to about 80 pounds per square inch by the compressive force of flexible diaphragm reducing the volume of chamber 24 by moving towards guide and stop assembly 58 and cylindrical container 52 moving into chamber 24. Since 160 pounds of force is being exerted upon member 40 to hold it against valve seat 36, spring 66 must be of less than 160 pounds force when fully compressed or spring 66 will pull valve member 40 from valve seat 36 with nothing more. Such an action would merely be a spring equivalent of the air pressure operated assembly of the previously discussed copending application Ser. No. 827,787 and not achieve the desired objectives of the present invention. In actuality, spring 66 can be considerably less powerful than 160 pounds of compressive force inasmuch as the only time that spring 66 is operative to move valve member 40 is when the differential pressure on valve member 40 has been removed—wherefore spring is operative against virtually no force whatsoever. As will be understood from the operative description hereinbefore, spring 68 must be of a compressive force which, in combination with spring 66, produces a force greater than 160 pounds before fully collapsing. It will be noted that spring 68 is also shorter than spring 66, acting more as a semi-rigid collar. Thus, in the tested emdodiment, spring 68 was of a compressive force of approximately 180 to 200 pounds.

Thus, it can be seen from the foregoing description that the accumulator-distributor of the present invention has truly provided an apparatus which is operably independent of the operating pressures of the irrigation fluid being employed within workable tolerances and which should be virtually unaffected by aging of the parts employed therein.

While not preferred, it should be understood that first spring 66 could combine the functions of first spring 66 and second spring 68. That is, by proper sizing of spring 66, spring 66 can be made to increasingly urge the valve member 40 out of contact with valve seat 36 until such point that the force of spring 66 is sufficient to lift valve member 40 from valve seat 36. Spring 66 would then completely retract valve member 40 as previously described.

Wherefore, having thus described my invention, I claim:

1. An improved water accumulator-distributor for an agricultural sprinkler comprising:
   (a) a hollow closed body having an inlet adapted for connection to a source of fluid under pressure and an outlet opening including a valve seat;
   (b) a flexible diaphragm disposed within said body to divide said body into two chambers, said inlet and said outlet opening being in communication with one of said two chambers, the other of said two chambers being filled with compressed gas at a pressure less than the minimum pressure of said fluid under pressure;
   (c) a valve member adapted for sealed mating with said valve seat to close said outlet opening to prevent fluid from exiting said one of said two chambers to said outlet opening, said member being movable between a first position where said valve seat is closed thereby and a second position where said valve seat is open for the passage of fluid therethrough to exit said body through said outlet opening;
   (d) first bias means carried by said flexible diaphragm for increasingly urging said valve member towards said second position as said flexible diaphragm is flexed by an increasing volume of fluid under pressure being introduced into said one of said two chambers through said inlet, said first bias means being adapted to produce a maximum bias force insufficient to lift said valve member from said valve seat against the differential pressure of said fluid in said one chamber when said valve member is in said first position and sufficient to move said valve member completely from said first position to said second position when said differential pressure is removed therefrom; and, (e) means carried by said flexible diaphragm for lifting said valve member from said valve seat an amount sufficient to remove the differential pressure therefrom when said diaphragm reaches its desired point of maximum flexure from the passage of fluid under pressure into said one of said two chambers whereby said valve member is moved to said second position by said first bias means to allow the water accumulated in said one chamber to be expulsed through said outlet opening.

2. The improved accumulator-distributor of claim 1 wherein:

said lifting means comprises a second bias means for increasingly urging said valve member towards said second position as said flexible diaphragm is flexed by an increasing volume of fluid under pressure being introduced into said one of said two chambers through said inlet, said second bias means being adapted to produce an increasing force in combination with said first bias means which force finally exceeds said differential pressure at the point when said diaphragm reaches its desired point of maximum flexure whereby said valve member is lifted from said valve seat by the combined bias force of said first and second bias means in combination.

3. In accumulator-distributor sprinkling apparatus including an accumulating chamber having an expandable wall biased toward a minimum volume position, an outlet opening from said chamber, and a valve member adapted to mate with and close said outlet opening while the chamber accumulates a quantity of water and to retract from and open said outlet opening to allow the accumulated water to be expulsed through the outlet opening by the bias force of said wall in a burst, the improvement for operating the valve member comprising:

(a) first bias means operably connected between the expandable wall and the valve member for increasingly biasing the valve member toward its retracted position as water is accumulated and the wall expands, the maximum bias force of said first bias means being less than the force of the water being accumulated within the chamber tending to hold the valve member in the seated opening; and (b) means operably connected for lifting the valve member from the seated opening when the chamber has reached a preselected point of expansion an amount sufficient to allow a portion of the accumulated water to pass through the seated opening and equalize the pressure of the water on both sides of the valve member whereby the force on the valve member by the water within the chamber tending to hold the valve member in the seated opening is less than the force of said first bias means and said first bias means is able to move the valve member to its retracted position.

4. The improvement to accumulator-distributor sprinklers of claim 3 wherein;

(a) the expandable wall comprises a diaphragm disposed within an enclosure dividing the enclosure into the accumulating chamber and a compression chamber;

(b) the biasing force toward the minimum volume is provided by second bias means disposed within the compression chamber for exerting said bias force on said diaphragm;

(c) the valve member is on a first side of said diaphragm, has a shaft connected thereto on one end, said shaft passes through said diaphragm normal thereto in sliding relationship therewith and said shaft has a second end on a second side of said diaphragm; and, (d) said first bias means comprises a spring connected to said diaphragm on one end and to said second end of said shaft on its other end.

5. The improvement to accumulator-distributor sprinklers of claim 4 wherein:

(a) said second bias means comprises a compressed gas disposed within said compression chamber; and, (b) sealing means are provided for allowing said shaft to slide freely through said diaphragm while blocking any flow of said compressed gas from said compression chamber into said accumulation chamber through said diaphragm.

6. The improvement to accumulator-distributor sprinklers of claim 5 wherein:

said sealing means comprises an enclosure disposed within said compression chamber having said shaft and said spring disposed within and being in sealed connection to said diaphragm.

7. The improvement to accumulator-distributor sprinklers of claim 6 wherein:

(a) said spring is a cylindrical spring disposed concentrically about said shaft;

(b) said sealing means comprises a rigid cylinder concentrically disposed about said spring being closed on the end away from said diaphragm and circumferentially connected to said diaphragm on the other end.

8. The improvement to accumulator-distributor sprinklers of claim 7 wherein additionally:

guide and support means are provided for guiding said rigid cylinder in concentric sliding relationship with said shaft as said diaphragm flexes and for supporting said diaphragm against flexture beyond a maximum amount as said accumulation chamber fills with water.

9. The improvement to accumulator-distributor sprinklers of claim 7 wherein said lifting means comprises:

(a) a cylindrical spring connected to said diaphragm and disposed concentrically with said second bias means spring; and, (b) means carried by said shaft for engaging said lifting means spring at a point in the flexture of said diaphragm whereby the compressive force of said latter named spring is transmitted to said shaft.

10. The improvement to accumulator-distributor sprinklers of claim 7 wherein said lifting means comprises:

(a) a rigid member connected to said diaphragm within said container to move in combination therewith; and, (b) means carried by said shaft for engaging said rigid member at the maximum flexure point in the flexing of said diaphragm whereby further flexing of said diaphragm carries said shaft in combination therewith to lift said valve member from the seated opening.

11. An improved water accumulator-distributor for an agricultural sprinkler comprising:

(a) a hollow closed body having an inlet adapted for connection to a source of fluid under pressure and an outlet opening including a valve seat;

(b) a flexible diaphragm disposed within said body to divide said body into two chambers, said inlet and said outlet opening being in communication with one of said two chambers, the other of said two chambers being filled with compressed gas at a pressure less than the minimum pressure of said fluid under pressure;

(c) a valve member adapted for sealed mating with said valve seat to close said outlet opening to prevent fluid from exiting said one of said two chambers to said outlet opening, said member being movable between a first position where said valve seat is closed thereby and a second position where said valve seat is open for the passage of fluid therethrough to exit said body through said outlet opening; and, (d) activation means carried by said flexible diaphragm for continuously urging said valve member towards said second position as said flexible diaphragm is flexed by an increasing volume of fluid under pressure being introduced into said one of said two chambers through said inlet, for lifting said valve member from said valve seat an amount sufficient to remove the differential pressure therefrom when said diaphragm reaches its desired point of maximum flexure from the passage of fluid under pressure into said one of said two chambers, and for moving said valve member to said second position when said differential pressure has been removed whereby the water accumulated in said one chamber can be expulsed through said outlet opening.

12. The improved accumulator-distributor of claim 11 wherein said activation means comprises:

(a) first bias means carried by said flexible diaphragm for continuous and increasingly urging said valve member towards said second position as said flexible diaphragm is flexed by an increasing volume of fluid under pressure being introduced into said one of said two chambers through said inlet, said first bias means being adapted to produce a maximum bias force insufficient to lift said valve member from said valve seat against the differential pressure of said fluid in said one chamber when said valve member is in said first position and sufficient to move said valve member completely from said first position to said second position when said differential pressure is removed therefrom; and, (b) means carried by said flexible diaphragm for lifting said valve member from said valve seat an amount sufficient to remove the differential pressure therefrom when said diaphragm reaches its desired point of maximum flexure from the passage of fluid under pressure into said one of said two chambers whereby said valve member is moved to said second position by said first bias means to allow the water accumulated in said one chamber to be expulsed through said outlet opening.

13. The improved accumulator-distributor of claim 12 wherein:

said lifting means comprises a second bias means for increasingly urging said valve member towards said second position as said flexible diaphragm is flexed by an increasing volume of fluid under pressure being introduced into said one of said two chambers through said inlet, said second bias means being adapted to produce an increasing force in combination with said first bias means which force finally exceeds said differential pressure at the point when said diaphragm reaches its desired point of maximum flexure whereby said valve member is lifted from said valve seat by the combined bias force of said first and second bias means in combination.

14. In accumulator-distributor sprinkling apparatus including an accumulating chamber having an expandable wall biased toward a minimum volume position, an opening from said chamber, a valve member adapted to mate with and close the opening from the chamber while the chamber accumulates a quantity of water and to retract from and open the opening when in retracted position to allow the accumulated water to be expulsed through the opening by the bias force of said wall in a burst, the improvement for operating the valve member comprising:

(a) actuation means operably connected between the expandable wall and the valve member for continuously biasing the valve member toward its retracted position as water is accumulated and the wall expands, for lifting the valve member from the opening when the chamber has reached a predetermined point of expansion an amount sufficient to allow a portion of the accumulated water to pass through the opening to equalize the pressure of the water on both sides of the valve member, and for moving the valve member to its retracted position when the valve member has been lifted from the opening.

15. The improvement to accumulator-distributor sprinklers of claim 14 wherein said actuation means comprises:

(a) first bias means operably connected between the expandable wall and the valve member for continuously and increasingly biasing the valve member toward its retracted position as water is accumulated and the wall expands, the maximum bias force of said first bias means being less than the force of the water being accumulated within the chamber tending to hold the valve member in the opening; and, (b) means operably connected for lifting the valve member from the opening when the chamber has reached a preselected point of expansion an amount sufficient to allow a portion of the accumulated water to pass through the opening and equalize the pressure of the water on both sides of the valve member whereby the force on the valve member by the water within the chamber tending to hold the valve member in the opening is less than the force of said first bias means and said first bias means is able to move the valve member to its retracted position.

16. The improvement to accumulator-distributor sprinklers of claim 15 herein;
  (a) the expandable wall comprises a diaphragm disposed within an enclosure dividing the enclosure into the accumulating chamber and a compression chamber;
  (b) the biasing force toward the minimum volume is provided by second bias means for exerting said bias force on said diaphragm;
  (c) the valve member is on a first side of said diaphragm, has a shaft connected thereto on one end, said shaft passes through said diaphragm normal thereto in sliding relationship therewith and said shaft has a second end on a second side of said diaphragm; and,
  (d) said first bias means comprises a spring connected to said diaphragm on one end and to said second end of said shaft on its other end.

17. The improvement to accumulator-distributor sprinklers of claim 16 wherein:
  (a) said second bias means comprises a compressed gas disposed within said compression chamber; and,
  (b) sealing means are provided for allowing said shaft to slide freely through said diaphragm while blocking any flow of said compressed gas from said compression chamber into said accumulation chamber through said diaphragm.

18. The improvement to accumulator-distributor sprinklers of claim 17 wherein:
  said sealing means comprises an enclosure disposed within said compression chamber having said shaft and said spring disposed within and being in sealed connection to said diaphragm.

19. The improvement to accumulator-distributor sprinklers of claim 18 wherein:
  (a) said spring is a cylindrical spring disposed concentrically about said shaft;
  (b) said sealing means comprises a rigid cylinder concentrically disposed about said spring being closed on the end away from said diaphragm and circumferentially connected to said diaphragm on the other end.

20. The improvement to accumulator-distributor sprinklers of claim 19 wherein additionally:
  guide and support means are provided for guiding said rigid cylinder in concentric sliding relationship with said shaft as said diaphragm flexes and for supporting said diaphragm against flexture beyond a maximum amount as said accumulation chamber fills with water.

21. The improvement to accumulator-distributor sprinklers of claim 19 wherein said lifting means comprises:
  (a) a cylindrical spring connected to said diaphragm and disposed concentrically with said second bias means spring; and,
  (b) means carried by said shaft for engaging said lifting means spring at a point in the flexture of said diaphragm whereby the compressive force of said latter named spring is transmitted to said shaft.

22. The improvement to accumulator-distributor sprinklers of claim 19 wherein said lifting means comprises:
  (a) a rigid member connected to said diaphragm within said container to move in combination therewith; and,
  (b) means carried by said shaft for engaging said rigid member at the maximum flexture point in the flexing of said diaphragm whereby further flexing of said diaphragm carries said shaft in combination therewith to lift said valve member from the seated opening.

* * * * *